US009442265B2

(12) United States Patent
Hill et al.

(10) Patent No.: US 9,442,265 B2
(45) Date of Patent: Sep. 13, 2016

(54) OPTICAL FIBER MANAGEMENT SYSTEM

(71) Applicant: Clearfield, Inc., Plymouth, MN (US)

(72) Inventors: John P. Hill, Andover, MN (US); Walter E. Power, II, Jordan, MN (US); Randy T. VanHorn, Crosby, MN (US)

(73) Assignee: Clearfield, Inc., Minneapolis, MN (US)

( * ) Notice: Subject to any disclaimer, the term of this patent is extended or adjusted under 35 U.S.C. 154(b) by 110 days.

(21) Appl. No.: 14/027,553

(22) Filed: Sep. 16, 2013

(65) Prior Publication Data

US 2014/0079365 A1 Mar. 20, 2014

Related U.S. Application Data

(60) Provisional application No. 61/702,558, filed on Sep. 18, 2012.

(51) Int. Cl.
*G02B 6/00* (2006.01)
*G02B 6/44* (2006.01)
*G02B 6/38* (2006.01)

(52) U.S. Cl.
CPC .......... *G02B 6/4439* (2013.01); *G02B 6/4452* (2013.01); *G02B 6/4453* (2013.01); *G02B 6/4454* (2013.01); *G02B 6/4455* (2013.01); *G02B 6/3897* (2013.01)

(58) Field of Classification Search
CPC ............. G02B 6/3897; G02B 6/4446; G02B 6/4452–6/4455
USPC .................................. 385/135–137
See application file for complete search history.

(56) References Cited

U.S. PATENT DOCUMENTS

| 6,915,059 | B2* | 7/2005 | Daoud ................. G02B 6/4454 385/135 |
| 8,311,380 | B2* | 11/2012 | Anderson ............ G02B 6/4455 385/135 |
| 8,989,547 | B2* | 3/2015 | Brower et al. ................. 385/135 |
| 2005/0002633 | A1* | 1/2005 | Solheid et al. ............... 385/135 |
| 2005/0025444 | A1* | 2/2005 | Barnes .................... A47B 88/08 385/135 |
| 2006/0275009 | A1* | 12/2006 | Ellison et al. ................ 385/135 |
| 2007/0280618 | A1* | 12/2007 | Xin et al. ...................... 385/135 |
| 2008/0085092 | A1* | 4/2008 | Barnes ................ G02B 6/4455 385/135 |
| 2009/0324189 | A1* | 12/2009 | Hill et al. ..................... 385/135 |
| 2010/0278498 | A1* | 11/2010 | Zimmel ....................... 385/135 |
| 2011/0268405 | A1* | 11/2011 | Cote et al. ........... G02B 6/4452 385/135 |

* cited by examiner

*Primary Examiner* — Robert Tavlykaev
(74) *Attorney, Agent, or Firm* — Pepper Hamilton LLP

(57) ABSTRACT

The present disclosure includes systems and apparatuses for an optical fiber management system. One embodiment of an optical fiber management system includes a cabinet comprising a system of building blocks that make up a rail-mounting system and an optical fiber management apparatus housed within one of the building blocks. The optical fiber management apparatus can comprise a housing, an adaptor plate resiliently connected to the housing, a splice tray, a housing cover, a radius limiter, and a base configured for integrated slack storage of at least one of buffer tube and ribbon cable.

20 Claims, 11 Drawing Sheets

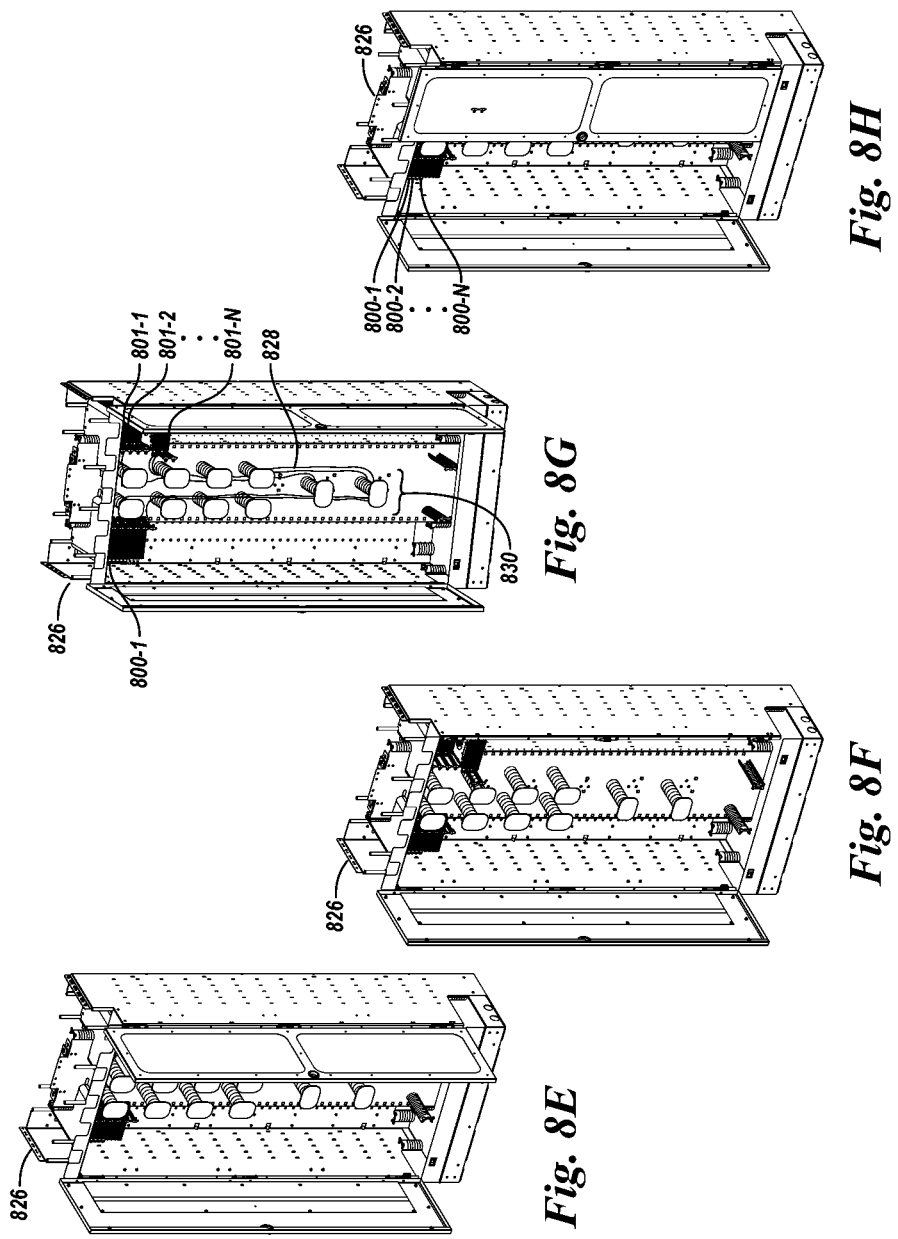

OPTICAL FIBER MANAGEMENT SYSTEM

BACKGROUND

An optical fiber (e.g., glass, plastic) carries light along its length. Light is kept in the core of the optical fiber by internal reflection. The optical fiber acts as a waveguide. Optical fiber can be used as a communication medium for telecommunication and networking applications because it is flexible and can be bundled into cables. Although referred to as "optical fiber," optical fiber is not restricted to communicating light in the visible spectrum, and may transmit light signals of higher or lower wavelengths.

Optical fiber is advantageous for communications because light propagates through the fiber with less attenuation as compared to electrical signals using metal wires. This facilitates long distance communications using few repeaters. Unlike electrical communication modes, light signals are immune to electromagnetic interference, thereby eliminating cross-talk between signals and the effects of environmental noise. Non-armored optical fiber cables do not conduct electricity, which makes optical fiber a good solution for protecting communications equipment located in electrically-exposed environments, including communication structures prone to lightning strikes.

Optical fiber permits transmission at higher bandwidths (e.g., data rates) than other forms of communications. Per-channel light signals propagating in the fiber can be modulated at rates in the range of gigabits per second. An individual optical fiber can carry many independent channels, each using a different wavelength of light and wavelength-division multiplexing (WDM). Optical fiber saves space in cable ducts because a single optical fiber can carry much more data than a single electrical cable.

A fiber optic cable can be made up of many individual optical fibers. For example, according to one commercially available configuration, twelve (12) 250 micron optical fibers may be grouped together in a jacketed fiber (e.g., ribbon, buffer tube, etc.). For example, a fiber optic cable may contain 6 buffer tubes (i.e., for a total of 72 optical fibers) and one or more strength members (e.g., metallic member), with the buffer tubes and strength member being surrounded by a jacket providing physical and environmental protection. Other commercially available fiber optic cable configurations may include 144 optical fibers (e.g., 12 buffer tubes of 12 optical fibers each), or 288 optical fibers (e.g., 24 buffer tubes of 12 optical fibers each), among others.

Individual optical fibers can be fragile and require care to prevent fracturing, or breakage. Optical fiber can be subject to physical routes limited to a minimum bend radius, at the cable level and/or at an individual fiber level, to prevent fracturing, breakage, or signal distortions/losses. In addition, optical fibers may be damaged if they are subjected to excessive tension or physical impact. Due to the risk of damage, it is preferable to avoid handling individual fibers any more than is necessary.

Optical fibers are increasingly being used to provide signal transmission between various service providers (e.g., telephone systems, video systems, computer network, etc.) and individual users (e.g., homes, businesses). Fibers which support many propagation paths or transverse modes are called multi-mode fibers (MMF), while those which can only support a single mode are called single-mode fibers (SMF). MMF generally have a larger core diameter, and is used for short-distance communication links, and SMF is used for longer distance communication links. Working with optical fiber (e.g., splicing, splitting, patching) involves close tolerances, and is best accomplished in controlled environments where physical alignments, temperature, and cleanliness are better managed to facilitate precision work results.

Optical fiber connection apparatuses, such as outside plant distribution cabinets, distribution frames, pedestals, patch panels, and splice terminations are used wherever the interconnection or cross-connection of multiple optical fibers is required. For example, optical fiber cable comprising numerous individual fibers may enter a distribution cabinet, fiber frame, or patch panel for connection to the individual optical fibers that split off to provide service to homes or businesses. Often, it is desirable that such optical fiber management, and/or optical fiber connection apparatus, allow for the interconnection of a large number of individual fibers in as small a space as possible (e.g., high density connections). It is further desirable to reduce space requirements and deployment costs related to optical fiber management systems.

BRIEF DESCRIPTION OF THE DRAWINGS

FIGS. 8E-8H are perspective views of an interior of a cabinet in accordance with one or more embodiments of the present disclosure.

DETAILED DESCRIPTION

Figure 1:
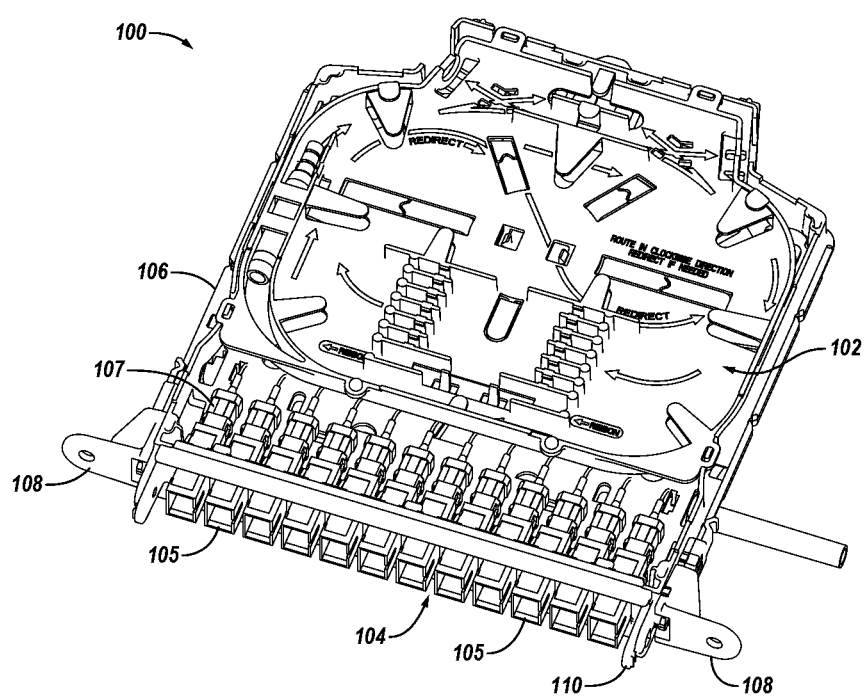
FIG. 1 is a perspective view of an optical fiber management apparatus in accordance with one or more embodiments of the present disclosure.

The present disclosure includes systems and apparatuses for an optical fiber management system. One embodiment of an optical fiber management system includes a cabinet comprising a system of building blocks that make up a rail-mounting system and an optical fiber management apparatus housed within one of the building blocks. The optical fiber management apparatus can comprise a housing, an adaptor plate resiliently connected to the housing, a splice tray, a housing cover, a radius limiter, and a base configured for integrated slack storage of at least one of buffer tube and ribbon cable.

Prior approaches to optical fiber management system require jacketed fiber (e.g., buffer tube, ribbon cable) slack storage within cabinets (e.g., outside plant distribution cabinets), frames (e.g., distribution frames), wallboxes, pedestals, patch panels, splice terminations, etc. (hereinafter "cabinets"). Slack storage of such jacketed fiber within a cabinet can reduce the amount of space available for optical ports (e.g., for a given cabinet footprint), which can result in a reduced port density associated with the cabinet. Alternatively, jacketed fiber slack storage could be provided exterior to such cabinets, which can make the fiber more susceptible to damage.

The present disclosure provides optical fiber management systems and methods for fiber management applications that satisfy the basic principles of fiber management with such systems. Various fiber management systems in accordance with the present disclosure comprise optical fiber management apparatuses (e.g., cassettes) with plural functional components that nest into a main housing portion to support various application and fiber types. In accordance with the present disclosure, such components can be added or removed depending on the application and configuration needs of the use environment. Advantageously, optical fiber management apparatuses in accordance with the present disclosure incorporate resilient (e.g., releasable, hinged, removable, detachable, etc.) connections and nested internal components for easy assembly and disassembly with minimal fasteners and/or tools.

Furthermore, the present disclosure provides optical fiber management systems including cable management optical fiber (e.g., individual and jacketed fiber) management apparatuses and management techniques that include one or more of the following capabilities: a reduced footprint to minimize space requirements; snap-together components; integrated slack storage and splicing functionality; building block packaging that offers compatibility with a number of different cabinets; rear and front access or front-access only to the cabinet; a "W"-shaped intra-bay route path to reduce improper jumper tie-in or weaving; patch only configuration by configuring a cassette to not include a splice tray thereby saving installed costs; patch and splice configuration to reduce costs without giving up convenience and/or the quality of splicing that traditional patch-only environments provide when multi-buffer tubes, multi-ribbon cables, or subunit cable is being used; reducing risk by eliminating as much interaction with fiber jumpers and tail as possible by having a resiliently connected adaptor plate allowing access to both sides of connectors for installation, cleaning and maintenance, particularly when in-service; and permitting modularity in the quantity of fiber being managed to balance present capital costs with future expandability.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

FIG. 1 is a perspective view of an optical fiber management apparatus 100 in accordance with one or more embodiments of the present disclosure. Optical fiber management apparatus, or "cassette" 100, (hereinafter "cassette") can comprise a housing 106, an adaptor plate 104, a first and second radius limiter (not shown in FIG. 1), a splice tray 102, a splice tray cover (not shown in FIG. 1), a housing cover (not shown in FIG. 1), a base (not shown in FIG. 1), and a base cover (not shown in FIG. 1). In a number of embodiments, cassette 100 does not include a splice tray (e.g., a patch-only configuration).

While cassette 100 can include all of the above-mentioned components, embodiments of the present disclosure are not so limited, and a particular cassette 100 may be assembled to include additional components not shown in FIG. 1, or less than all the components illustrated in FIG. 1, depending on a particular application.

Cassettes in accordance with the present disclosure can be used for both inside and outside plant environments. Cassettes in accordance with the present disclosure are made from materials suitable for harsh outside plant environments. Such cassettes are scalable to provide a range of port density and application needs.

One or more fiber optic cables comprising plurality of individual fibers may be provided to cassette 100, for example. For example, the housing of cassette 100 can comprise a surface that provides a first level of fiber management (e.g., individual fiber) and at least one opening that allows entry of an optical fiber cable, or a portion thereof (e.g., a buffer tube) into the housing. Such optical fiber cable may be broken out to (distributed as) individual optical fibers within cassette 100. Minimum bend radius specifications for such fibers can be maintained by cassette 100 such as by using a radius limiter, for example. In a number of embodiments, the radius limiter may include the cassette may have radius limiting capabilities without having a separate, dedicated radius limiter. For example, radius limiting may be accomplished by two components being nested together, as will be further discussed herein.

A number of radius limiters can be housed within the cassette and designed to correspond with a predetermined minimum bend radius for a particular fiber being managed by a particular cassette (e.g., 100 shown in FIG. 1). A radius limiter can be designed to be large enough to hold a pre-terminated fiber assembly captive to a surface of the housing. For instance, when adaptor plate 104 is exercised from the front of a cassette 100, a radius limiter functions to prevent individual and/or jacketed fibers from having an unacceptably small radius or bend. A radius limiter can also function to prevent fibers from jumping over the radius limiter and possibly creating unacceptable micro bends caused by pinch points resulting in radius violations.

In a number of embodiments, the radius limiter may be resiliently connected to the cassette. For example, the radius limiter may be releasable from the cassette. The radius limiter may be hinged and/or completely removable from the cassette, in a number of embodiments. A number of combinations of radius limiters may be present in the cassette. For instance, a radius limiter for a first type of fiber (e.g., jacketed fiber) may be integrated, while a radius limiter for a second type of fiber (e.g., unjacketed fiber) may be resiliently connected to the cassette.

Cassette 100 can also facilitate splitting or splicing individual fibers of a fiber optic cable to adaptor plate 104, which provides a plurality of connectors 105 (e.g., twelve, as illustrated) for connecting to individual fibers (e.g., of the fiber optic cable provided to cassette 100). Adaptor plate 104 can be resiliently connected to the housing (e.g., releasable from the housing), providing access to both sides of the adaptor plate, for example.

Cassette 100 is modular, and individual components of cassette 100 can functionally nest with each other for easy reliable assembly, disassembly, and/or maintenance. Moreover, cassette 100 utilizes resilient (e.g., removable, hinged, releasable, detachable, etc.) connections, such as snap-fit connections, for example, which provide the ability to assemble and disassemble cassette 100 with minimal or no tools and/or fasteners.

A housing cover can be resiliently connected to the housing 106, wherein when the adaptor plate 104 is exercised from a front of the cassette 100, both sides of the adaptor plate 104 are accessible without removing the housing cover. The housing cover can be removable from the housing to allow access to the splice tray 102 thereby. Splice tray 102 can comprise a plurality of splice channels and a surface that provides a second level of fiber management spaced from a first level of fiber management (e.g., housing 106). In a number of embodiments, splice tray 102 can include slack storage of a number of individual optical fibers (e.g., fibers separated from a buffer tube or ribbon). Slack storage of several feet of optical fiber is possible; however, embodiments are not limited to a particular length.

Splice tray 102 can function as a second level of fiber (e.g., individual fiber) management within a cassette (e.g., 100 in FIG. 1). Splice tray 102 provides a second level that is physically segregated from the first level of fiber management (e.g., a base of housing 106) in that such surfaces are generally parallel. For additional physical segregation, splice tray 102 may be covered within the cassette (e.g., such as by cover 212 shown in FIG. 2). In a number of examples, splice tray 102 is nested atop a base of the cassette. Splice tray 102 can be integrated into the cassette in a number of examples, and in other examples, splice tray 102 can be resiliently connected to (e.g., releasable from) cassette 100.

Housing 106, a radius limiter, splice tray 102, a splice tray cover, a base, a base cover, and a housing cover of cassette 100 can comprise substantially clear plastic or the like allowing for a quick and easy first-step troubleshooting of unacceptable light leakage. By clear it is meant that the material used for cassette 100 is at least partially transmissive of a desired wavelength or range of wavelengths usable for identifying problems with fibers within cassette 100 such as breaks, fractures, cracks, or other unacceptable conditions. In a various embodiments, cassette 100 comprises plastic that is at least partially transmissive of visible light so problems with fibers inside cassette 100 can be visibly identified without opening cassette 100. For example, light leakage indicative of connection problems is observable through plastic that is at least partially transmissive of light. Furthermore, when using colored jacketed fiber tubes (e.g., colored buffer tubes) following EIA/TIA color code (e.g., for 12 fiber bundles), a cassette that is at least partially transmissive of visible light (e.g., clear) permits easy identification of a particular fiber (e.g., identified by its particular color coding), or fiber number, if a break or other damage thereto has occurred.

In one or more embodiments, splice tray 102 is configured to be substantially opaque while housing 106 and a housing cover are clear. By substantially opaque it is meant that the material is not transmissive of a desired wavelength or range of wavelengths usable for identifying problems with fibers within cassette 100. Splice tray 102 is made of material that makes it easier to see an unacceptable condition of an optical fiber (e.g., individual and/or jacketed fiber) within cassette 100 such as a break or crack or the like by providing contrast between a light signal in such optical fiber and splice tray 102. As an example, colored plastic can be used such as black, blue, brown, or white, to make it easier to see an unacceptable optical fiber condition within cassette 100 when being tested for such conditions. In this way, because housing 106 and a housing cover are clear, troubleshooting can be performed without having to open the cassette to reveal the internal contents. Components of cassette 100 may also be color coded in any desired way to aid in quickly identifying such components.

Cassette 100 can also comprise ruggedized plastic components suitable for harsh outside plant temperature and environmental conditions such as for use in outside plant cabinets for FTTx applications. Fiber to the home, business, premise, etc. is often referred to as FTTH (fiber to the home), FTTP (fiber to the premise) where FTTx is a generic term for all end-points of an all fiber network to an end user. Cassette 100, because of its modularity, can be used from central office to outside plant thereby reducing the learning curve and service turn-up time due to familiarity of cassette 100 throughout the network.

Adaptor plate 104 comprises internal connectors 107, which function to provide a connection between adaptor plate 104 and individual fibers within cassette 100 and external connectors 105, which function to connect individual fibers within cassette 100 and other desired components. Adaptor plate 104 may comprise any desired number of connections. Adaptor plate 104 can also comprise fastener 110 used to attach adaptor plate 104 to housing 106 (e.g., fastener 110 is a fastening feature that is a part of adaptor plate 104). Fastener 110 can use resilient connections to attach adaptor plate 104 to housing 106. The resilient connection can comprise a flexible elastic portion that can flex or deflex to engage with a corresponding portion, which may be a flexible portion as well. The resilient connections can be engaged and disengaged, such as for assembly and disassembly of components, with minimal or no tools and/or fasteners. Conventional fasteners may be used, however, such as screws and bolts and the like.

In a number of embodiments, cassette 100 can include resiliently connected (e.g., releasable, removable, hinged, detachable) connector tabs 108 for backwards compatibility with prior methods and apparatuses for optical fiber management. For example, tabs 108 can be used to mount or secure the cassette 100 to another structure, such as a patch panel for rack mounting, wallbox, cabinet, frame, pedestal, etc. Tabs 108 may be removed prior to use with a rail system comprising building blocks, as will be discussed further herein.

Port capacity can be added in-patch only or patch and splice configurations. Cassettes having different configurations can be mixed and matched in a particular installation as desired or needed by a user. For example, a cabinet can be used to initially deploy one or more cassettes having a patch-only configuration. Subsequently, due to previously unforeseen subscriber demand, additional cassettes having a patch and splice configuration can be added to the cabinet to accommodate the unforeseen demand or future growth. Additionally, cassettes can be configured to house optical components such as coarse or dense-wave division multiplexors, optical circulators, or optical splitters. Plug n Play, terminated fibers on both A & B ends of the assembly within the cassette, configurations may be available as well. The capability to add cassettes of different configurations as needed over time, or even re-configuring particular cassettes of a given installation, facilitates a modular fiber management solution that avoids capital investment until needed, thereby lowering costs.

Cassette 100 can be deployed as a 12-port self-contained fiber management solution, and this can allow for service providers to stock a single fiber management component for various environments. By reducing inventory levels and technician training and installation time, principles of optical fiber management can be promoted without exposure to environmental hazards or human interaction. As the cassettes are modular handling units of up to 12 individual fibers, the quantity of cassettes may be selected to accommodate a presently used fiber count, and subsequently modified to accommodate a different future individual fiber count.

Figure 2:
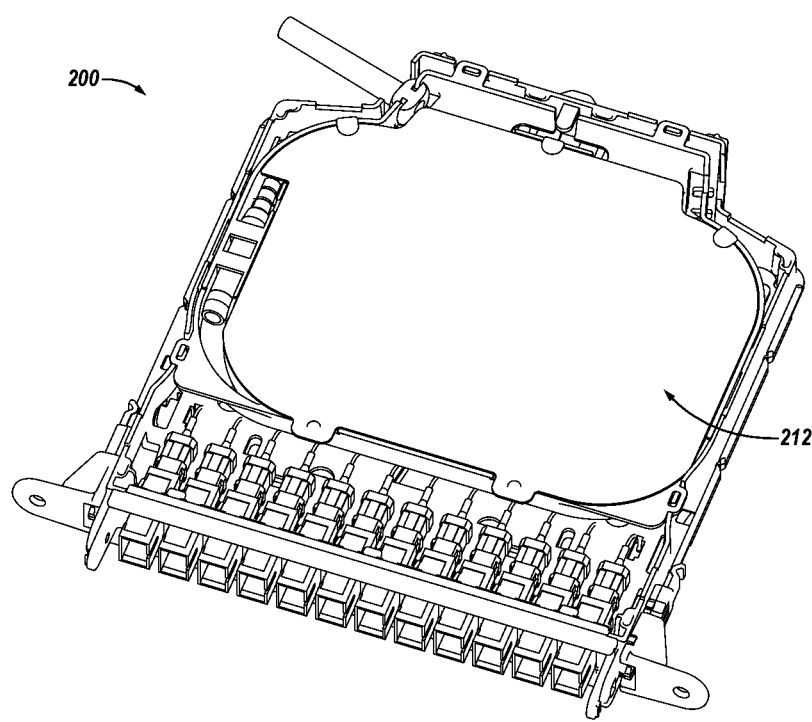
FIG. 2 is a perspective view of an optical fiber management apparatus in accordance with one or more embodiments of the present disclosure.

FIG. 2 is a perspective view of an optical fiber management apparatus 200 in accordance with one or more embodiments of the present disclosure. FIG. 2 illustrates splice tray cover 212, which can be used to protect individual fibers and/or other components within a splice tray (e.g., tray 102). Splice tray cover 212 can be distinct from a housing cover in a number of embodiments. Splice tray cover 212 can be clear (e.g., transparent) in a number of embodiments, and can prevent fibers from being exposed (e.g., "walking out" of splice tray 102). Such exposure may increase risk of damage to the fibers, for example.

Figure 3A:
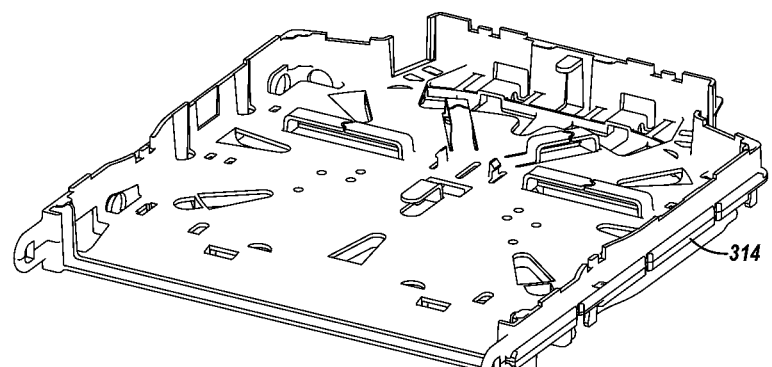
FIG. 3A is a perspective view of a base in accordance with one or more embodiments of the present disclosure.

FIG. 3A is a perspective view of a base 314 in accordance with one or more embodiments of the present disclosure. Base 314 can be a component of a cassette (e.g., cassette 100) and can house slack jacketed fiber (e.g., slack buffer tube storage, slack ribbon cable storage, etc.). For example, each cassette base (e.g., base 314) can accommodate several feet (e.g., 10 feet) of jacketed fiber slack storage (e.g., buffer tube, loose 900 um fibers) on either or both sides of the base. As an example, the base 314 can include a number of storage tabs (e.g., integral storage tabs 371 shown in FIG. 5A) used to store slack jacketed fiber (e.g., jacketed fiber 518 shown in FIG. 5A).

Cassette 100 can include not only slack storage of jacketed fiber comprising a number of individual optical fibers, but also slack storage of individual fibers themselves (e.g., in splice tray 102). By including integrated slack storage (e.g., jacketed fiber slack storage and/or individual fiber slack storage) along with the splicing functionality of cassette 100, labor time and space savings can be realized.

Integrated slack storage can also reduce or eliminate a need to provide slack storage of individual and/or jacketed fiber outside of the cassette. For example, in prior approaches, slack storage of jacketed fiber occurred inside a cabinet (e.g., to protect the fiber from the elements). This can reduce a risk of damage and/or disturbance to other jacketed fiber, for example. Slack storage of jacketed fiber in cassette 100 can eliminate the need to provide such slack storage inside a management cabinet, while still protecting the fiber from the elements. For instance, there is no need to provide room for spools of slack jacketed fiber in the cabinet, which can increase the amount of space available for the cassettes themselves. This can result in increased port density for a given cabinet footprint, among other benefits.

Integrated individual and/or jacketed slack storage can also result in an improved patch-cord routing system as compared to previous approaches. In some examples, integrated jacketed fiber slack storage can allow for accounting for 250 micron fiber, as compared to 900 micron fiber accounted for in previous approaches.

Jacketed fiber can include, for example, buffer tube and/or ribbon OSP cable, among others. A buffer tube segregates fiber within construction of an entire outside plant (OSP) jacket. For example, a "144" cable can provide twelve buffer tubes each containing twelve 250 um fibers, a "48" cable has four 12-fiber buffer tubes, etc. Whatever the fiber count is, each buffer tube within the construction needs to be broken out (e.g., outer jacket stripped away along with strength member which runs entire length of the segment) and brought to a cassette (e.g., cassette 100) to be spliced into it to complete the fiber circuit from a first point to a different point (e.g., a terminated end of the 12 fiber assembly provided inside the cassette).

A ribbon OSP cable does not have buffer tubes but rather a ribbon "stack" or "matrix" of some number of 12-fiber ribbon cables. For example, a 144 ribbon cable has twelve 12-fiber ribbons stacked on top of each other in one large central tube (or large buffer tube), a 48-fiber ribbon cable has four 12-fiber ribbons stacked on top of each other, etc. Buffer tubes and ribbon OSP cables can be "spliced" inside of a cassette (e.g., cassette 100).

A 12-fiber "terminated assembly" can be provided in the cassette, and it can begin as a single 12-fiber ribbon cable. It can then be broken out, unjacketed to 900 um media, and plugged into the adaptor side of the cassette. The other, unterminated, end is stored in the cassette and can be mass fusion spliced to another ribbon cable or de-laminated for single fiber fusion splicing.

Figure 3B:
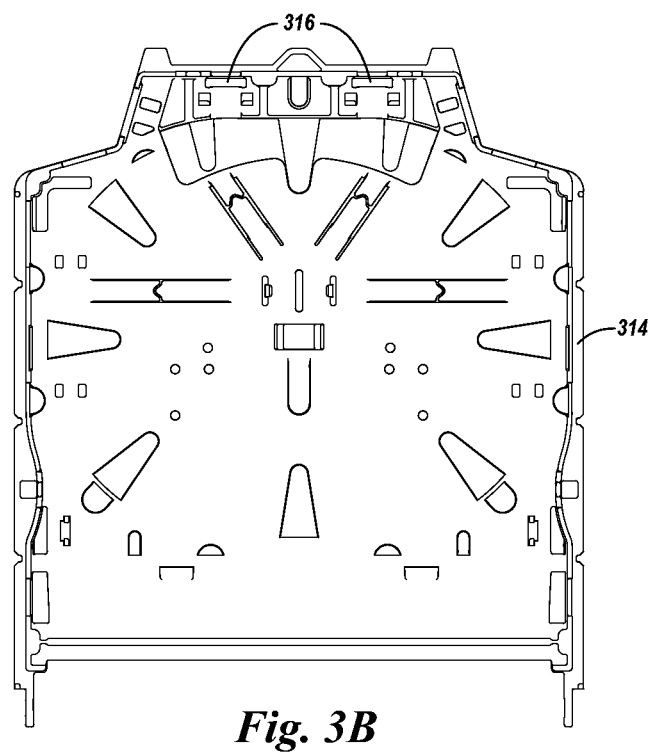
FIG. 3B is a bottom view of a base in accordance with one or more embodiments of the present disclosure.

FIG. 3B is a bottom view of a base 314 in accordance with one or more embodiments of the present disclosure. A base cover (not pictured) can be resiliently attached to base 314 in a number of locations, including, for example, at holes 316. The base cover can be removed from base 314, for example, utilizing a squeezing motion to release, detach, unhinge, and/or remove the base cover from base 314.

Figure 4A:
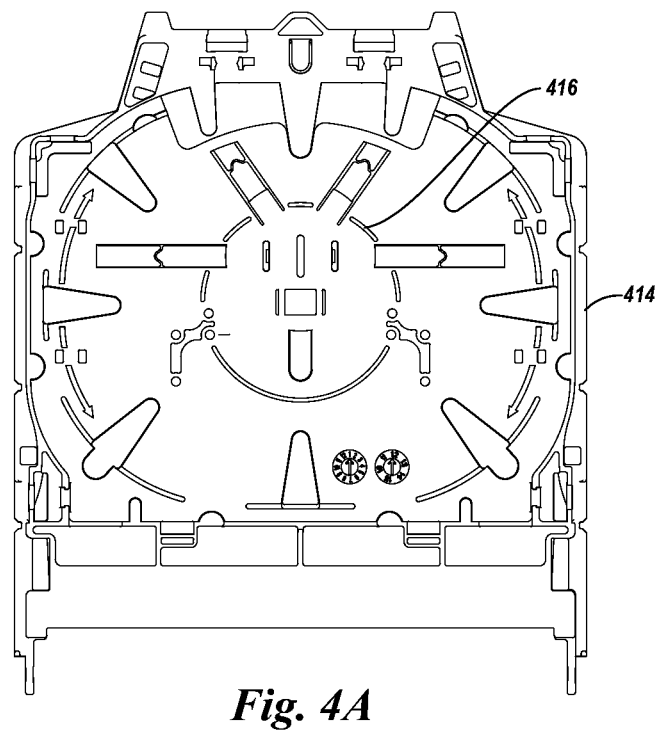
FIG. 4A is a bottom view of a base including a portion of a radius limiter in accordance with one or more embodiments of the present disclosure.
Figure 4B:
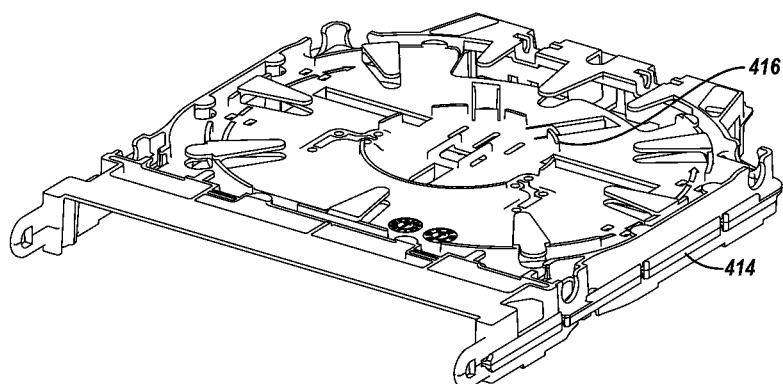
FIG. 4B is a perspective view of a base including a portion of a radius limiter in accordance with one or more embodiments of the present disclosure.

FIG. 4A is a bottom view of a base 414 including a portion 416 of a radius limiter in accordance with one or more embodiments of the present disclosure, and FIG. 4B is a perspective view of a base 414 including a portion 416 of a radius limiter in accordance with one or more embodiments of the present disclosure. In a number of embodiments, a base cover can include a second portion of the radius limiter that mates with first portion 416.

The mating portions of a radius limiter are designed with a radius that corresponds with a predetermined minimum bend radius for a particular individual fiber and/or jacketed fiber being managed by a particular cassette (e.g., 100 shown in FIG. 1). Also, the mated radius limiter is designed to be large enough to hold a pre-terminated fiber assembly captive to a surface of the base housing. The mated radius limiter also functions to prevent individual and/or jacketed fibers from jumping over the radius limiter and possibly creating unacceptable micro bends caused by pinch points resulting in radius violations.

Figure 5A:
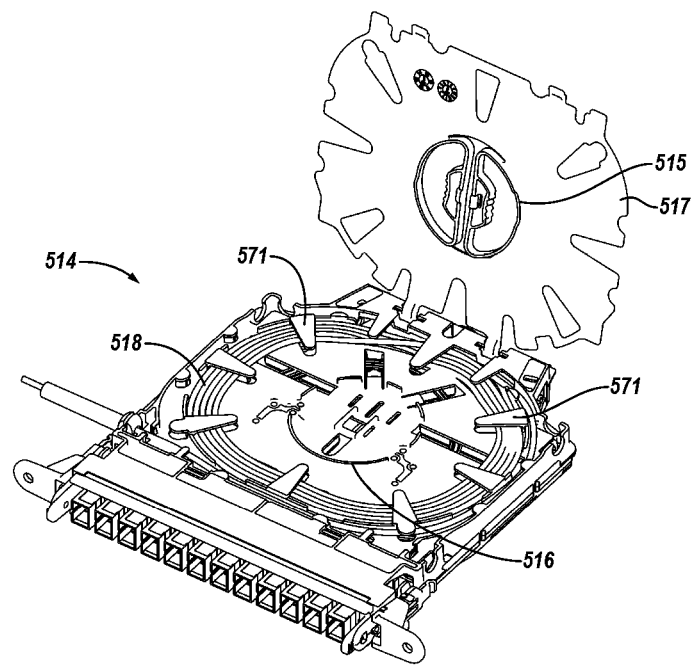
FIG. 5A is a bottom perspective view of a portion of an optical fiber management apparatus including slack storage in accordance with one or more embodiments of the present disclosure.

FIG. 5A is a bottom perspective view of a portion of an optical fiber management system including slack storage (e.g., jacketed fiber slack storage) in accordance with one or more embodiments of the present disclosure. Base 514 can include a portion 516 of a radius limiter, and jacketed fiber 518 can be stored within base 514. In this example, the jacketed fiber 518 is held in place via a number of storage tabs 571 integral with the base 514. This removes a need for stored jacketed fiber in a cabinet, which can save space and/or result in higher port density per cabinet, for example. Base cover 517 can include a second portion 515 of a radius limiter that can be mated with portion 516.

Jacketed fiber 518 can be stored as a continuous fiber transitioning from various protective jackets (e.g., buffer tube, 900 um, 250 um), which can be broken out and spliced within the cassette. For instance, jacketed fiber 518 can be spliced into different purposefully arranged geometries (e.g. buffer tube, ribbon cable, 250 micron optical fiber, 900 micron optical fiber, among others).

In a number of embodiments, constructions of multifiber outside plant cable can include subunits each containing twelve 250 um fibers. The subunits can be scaled to desired fiber count (e.g., 12 buffer tubes include 144-count cable). These buffer tubes can be broken out of a protective jacket during a splicing process and spliced to another cable (e.g., a 12-fiber ribbon cable broken out into 12 individual 900 um terminated fibers on the front of the cassette).

The route path of the fiber can be enclosed in the buffer tube, brought into the cassette, and slack stored in the bottom of the cassette. Then buffer tube can be brought up to the splice tray of the cassette, and the buffer tube can be removed, exposing the twelve 250 um fibers which may either be individually fusion spliced to the above mentioned pre-terminated assembly or "ribbonized" and mass fusion spliced to the assembly.

In a number of embodiments, the assembly within the cassette is a ribbon assembly that can be de-laminated for single fusion splicing as needed or left alone for mass fusion splicing. In such embodiments, inside the cassette the fibers transition, in order, from a jacketed buffer tube (e.g., all twelve fibers in the tube) slack stored in the lower level of the cassette, to bare 250 um fiber or ribbon slack stored in the splice tray. The fibers can be routed through the splice tray and each can be upjacketed to 900 um and slack stored in the bottom of the tray below the splice tray before they are connectorized and mated to the adapter on the front of the cassette.

Figure 5B:
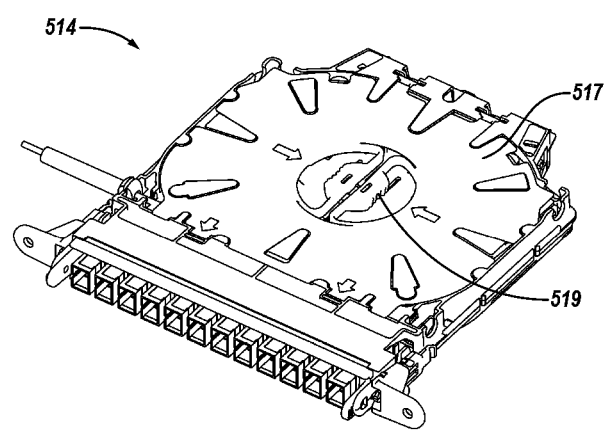
FIG. 5B is a bottom view of a portion of an optical fiber management apparatus in accordance with one or more embodiments of the present disclosure.

FIG. 5B is a bottom view of a portion of an optical fiber management system in accordance with one or more embodiments of the present disclosure. Base cover 517 can close and lock into place, as illustrated in FIG. 5B. Base cover 517 can be released, hinged, detached, and/or removed from base 514, for example, utilizing a squeezing motion at component 519 to release, detach, hinge, unhinge, and/or remove the base cover from base 514.

Figure 6:
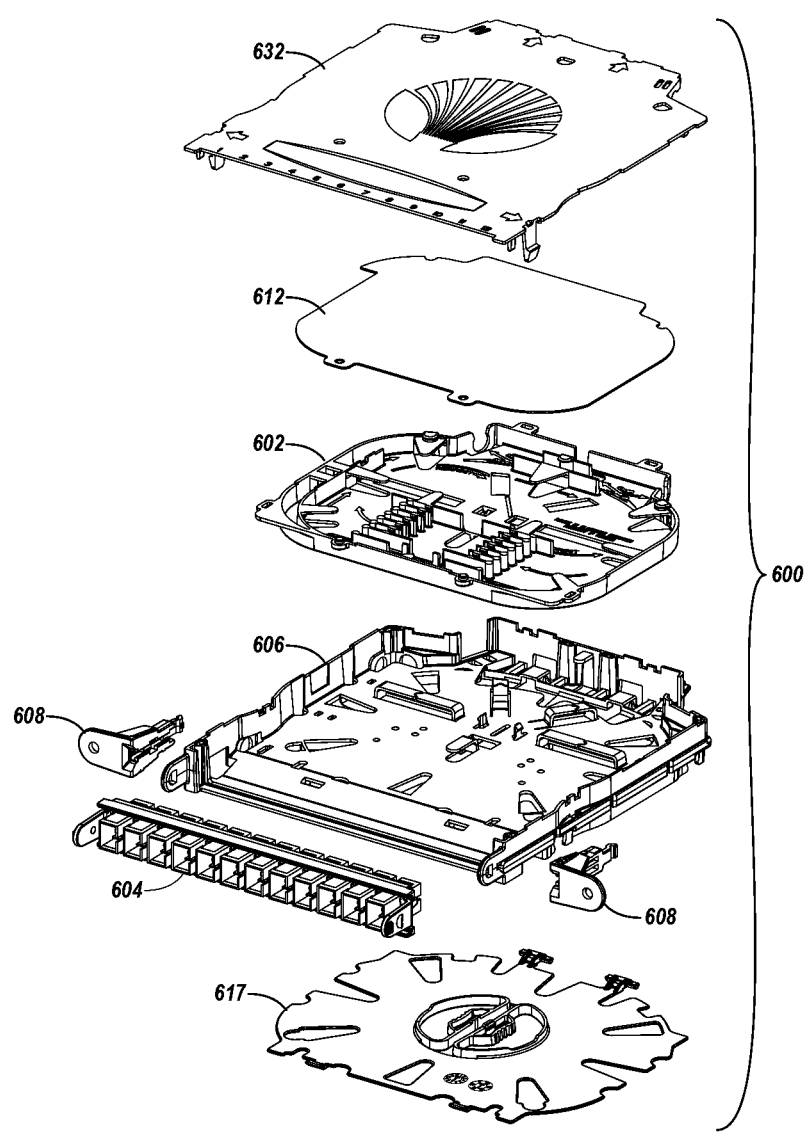
FIG. 6 is an exploded view of an optical fiber management apparatus in accordance with one or more embodiments of the present disclosure.

FIG. 6 is an exploded perspective view of optical fiber management apparatus 600 (e.g., cassette) in accordance with one or more embodiments of the present disclosure. In a number of embodiments, cassette 600 can include housing cover 632, splice tray cover 612, splice tray 602, housing 606, detachable tabs 608, adaptor plate 604, base cover 617, and base (not shown in FIG. 6). Cassette 600 can accommodate slack storage of jacketed fiber, (e.g., in base of housing 606) as well as slack storage of individual optical fibers broken out from the jacketed fiber (e.g., in splice tray 602).

While cassette 600 can include all of the above-mentioned components, embodiments of the present disclosure are not so limited, and a particular cassette 600 may be assembled to include additional components not shown in FIG. 6, or less than all the components illustrated in FIG. 6, depending on a particular application for cassette 600.

Figure 7A:
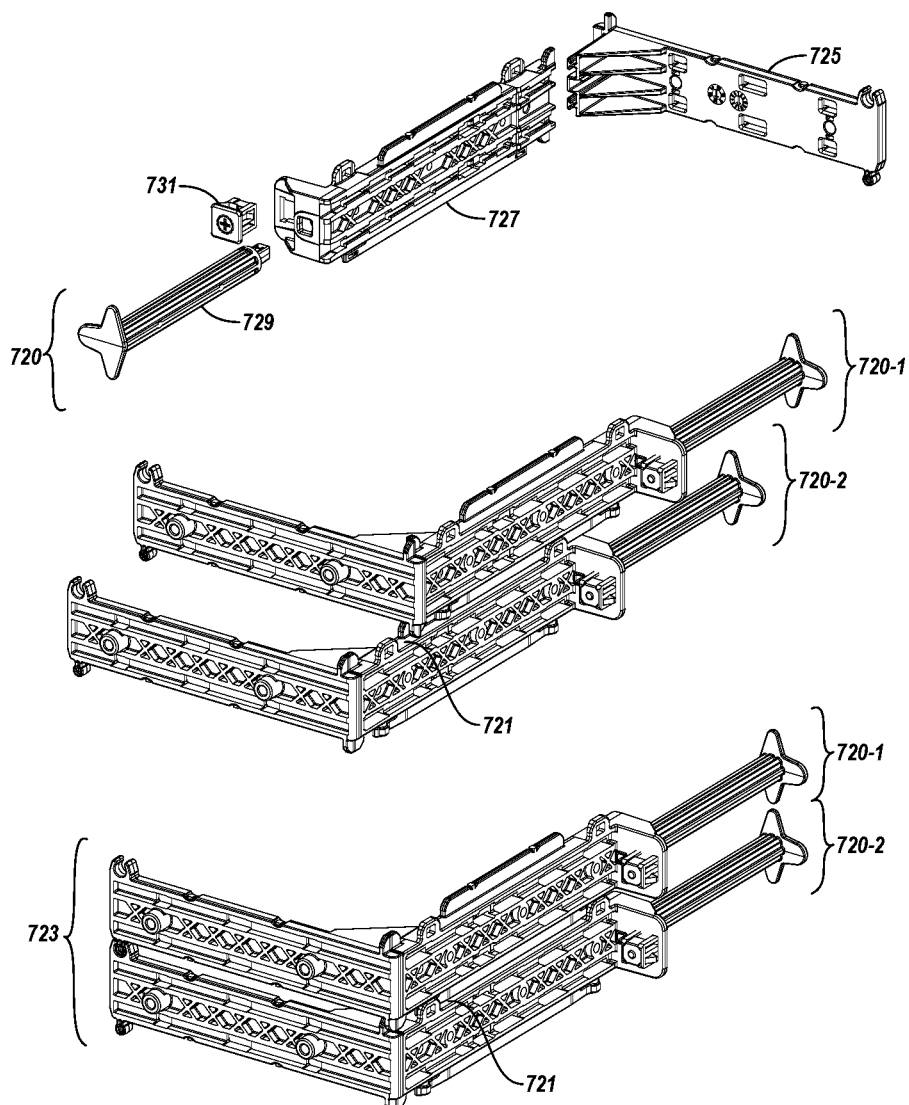
FIG. 7A is a perspective view of building blocks in accordance with one or more embodiments of the present disclosure.

FIG. 7A is a perspective view of building blocks 720-1 and 720-2 in accordance with one or more embodiments of the present disclosure. Building blocks 720-1 and 720-2 can include a number of components, as illustrated in FIG. 7A. For example, building blocks can include a fastener component 725, a rail component 727, an arm component 729, and a connection component 731. In a number of examples, components 725, 727, 729, and 731 can allow for installation into and/or removal of a building block without the use of tools. For example, components 725 and 727 can be mated together to create an "L" ganging bracket where component 727 provides a continuous detented "T" channel for which a cassette's (e.g., cassette 100) "T" rails are slid into for mounting. Component 725 can provide a stop (e.g., hard stop) and support pockets for tabs on the cassette to nest into, providing support for the back of the cassette when mounted in a horizontal position. Component 729 (e.g., a snap-in radius rod) can provide bend radius protection as mated jumpers, (e.g., on the front of the cassette) are transported off of the cassette and onto various route paths. The tabs on the end of component 729 can prevent piled-up jumpers from sliding off the end of component 729. Component 731 can be used to mount the ganging bracket assembly (e.g., components 725, 727, 729) to a cabinet and/or frame, with or without cassettes attached, in a tool less operation. For example, connection component 731 can allow for installation without the use of tools, but may require a tool (e.g., a screwdriver) for removal.

Building blocks 720-1 and 720-2 can interlock (e.g., slide into, "gang" together) with one another (e.g., interlocking at 721) and can be stackable in a number of embodiments, as illustrated at 723. Building blocks can be pre-loaded with at least one cassette, for example. While two building blocks are illustrated in FIG. 7A, it will be appreciated that more than two building blocks can be interlocked within the rail system, for example, without tools. Building blocks can be fastened to a cabinet as a component of optical fiber management, for example at component 725, without tools. Building blocks can be locked into the cabinet, etc. utilizing a spring component (not pictured in FIG. 7A), and building blocks can rest on bosses (not pictured in FIG. 7A), for example, within a cabinet, etc. In a number of examples, building blocks can be assembled without tools. Building blocks can be sufficiently strong so as to avoid sagging when loaded with a cassette. For example, a number of building blocks loaded with a number of cassettes can be loaded into a cabinet, pedestal, etc. without sagging.

Building blocks can be modular and adaptable. For example, a port count can be set by a user based on the number of cassettes and building blocks utilized by the user (e.g., in a particular cabinet). A user can choose port counts in multiples of 12 (e.g., number of ports per cassette), rather than port counts being dictated by a manufacturer, for example. A user may add to a port count by adding building blocks and cassettes as desired. Additionally, building blocks and/or cassettes may be reused.

Figure 7B:
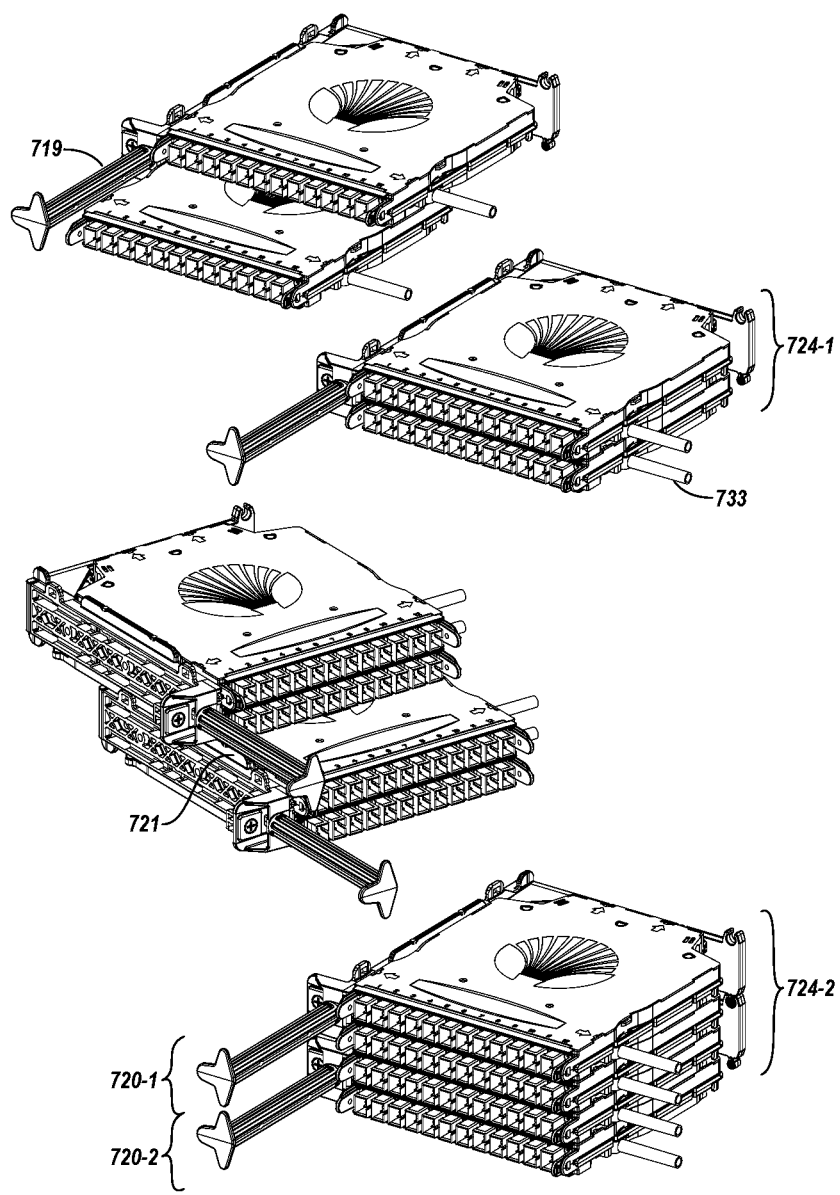
FIG. 7B is a perspective view of optical fiber management apparatuses within building blocks in accordance with one or more embodiments of the present disclosure.

FIG. 7B is a perspective view of optical fiber management apparatuses (e.g., cassettes) within building blocks 720-1 and 720-2 in accordance with one or more embodiments of the present disclosure. In a number of embodiments, a single building block (e.g., building block 720-1) can house a number of cassettes (e.g., two cassettes in this example) in a stacked manner 724-1. Building blocks 720-1 and 720-2 can house cassettes in a stacked manner 724-2, for example. For instance, two cassettes can be housed in building block 720-1 and two cassettes can be housed in building block 720-2. Two brackets housing four cassettes (e.g., as illustrated in FIG. 7B) includes 48 ports, for example. A cassette (e.g., cassette 100) can include outside ridges compatible with a building block (e.g., blocks 720-1 and 720-2) to allow for the cassette to slide into the building block, for example (as shown at 719, for example) without tools. For example, the ridges can extend outside of the cassette to slide along the rails of the building blocks. A cassette can include a strain relief tube 733, for instance, to increase strength of the system. A rail system comprising building blocks provides for reduced space between stacked cassettes as compared to prior approaches which can save space and/or increase port density in a number of embodiments.

Figure 8D:
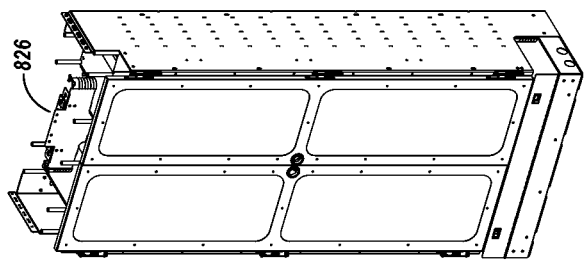
FIG. 8D is a perspective view of an exterior of a cabinet in accordance with one or more embodiments of the present disclosure.
Figure 8C:
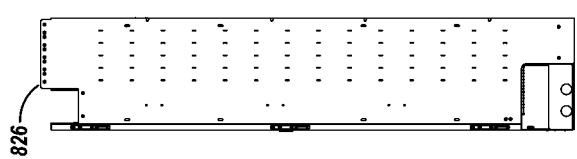
FIG. 8C is side view of a cabinet in accordance with one or more embodiments of the present disclosure.
Figure 8A:
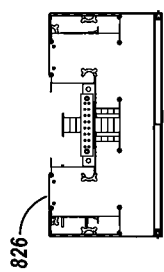
FIG. 8A is top view of a cabinet in accordance with one or more embodiments of the present disclosure.
Figure 8B:
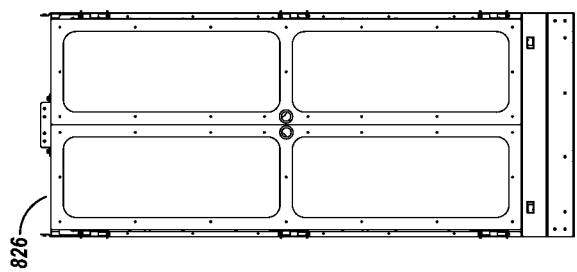
FIG. 8B is front view of a cabinet in accordance with one or more embodiments of the present disclosure.

FIGS. 8A-8H illustrate a cabinet 826 in accordance with one or more embodiments of the present disclosure. FIG. 8A is top view of cabinet 826, FIG. 8B is front view of cabinet 826, FIG. 8C is side view of cabinet 826, and FIG. 8D is a perspective view of an exterior of cabinet 826.

In a number of embodiments, cabinet 826 is a front-access only cabinet. For example, cabinet 826 can allow for cables coming into the front of the cabinet 826 (e.g., no back panel access), as compared to prior approaches that comprise cables coming into the rear or back of the cabinet. This can allow for space-savings, as two cabinets can be backed into one another without a need for an access path behind the cabinets, and/or cabinets can be backed against a wall, for example. For example, no dedicated rear aisle space is needed behind cabinet 826, which can result in a reclaiming of previously lost space. In some examples, cabinet 826 can include optional rear and/or front access.

FIGS. 8E-8H are perspective views of an interior cabinet 826 in accordance with one or more embodiments of the present disclosure. Cabinet 826 can comprise a system of building blocks (e.g., that make up a rail-mounting system) such as those described in FIGS. 7A-7B. In a number of examples, cabinet 826 is approximately seven feet tall, three feet wide, and eighteen inches deep. However, embodiments of the present disclosure are not so limited.

Cabinet 826 can house a number of cassettes, including, for example, cassettes 800-1, 800-2, . . . , 800-N and 801-1, 801-2, . . . , 801-N. Cassettes can be inserted and removed from cabinet 826 individually or in groups of two or more. Cabinet 826 can include jumpers 828 (e.g., patch cords) connecting a cassette (e.g., cassette 800-1) to a different cassette (e.g., cassette 801-1).

Cabinet 826, in a number of embodiments, does not include jacketed fiber slack storage. This can allow for an increased number of ports housed per square foot (e.g., improve by more than 40 percent), reducing real estate costs (e.g., $0.75 per port per year). Fiber management systems can also include, for example, frames (e.g., distribution frames), wallboxes, pedestals, patch panels, and splice terminations, among others, with and/or without jacketed fiber slack storage.

As illustrated in FIG. 8G, an integrated "W" intra-bay route path 830 can reduce chances of improper jumper tie-in or weaving, for example. Upper and lower troughs of cabinet 826 can support a number of jumpers (e.g., 6,600 jumpers) for inter-bay routing with left and right exit paths. In some examples, cabinet 826 can include lower trough doors that can be folded down for complete access while providing physical fiber protection when closed. Route path 830 includes patch cords that provide connectivity between two ports in a true cross-connect (e.g., intra-frame) or an inter-connect (e.g., inter-bay, frame-to-frame).

Cabinet 826, along with the rail system housed within the cabinet and the building blocks of the rail system, can be deployed alongside previous approaches to optical fiber management for bay-line up migration and/or growth strategy, for example.

In a number of embodiments, a front-access only cabinet 826 including jacketed fiber slack storage can be used. For example, jacketed fiber can be fed into a cassette, and the cassette can be loaded into the cabinet. Such examples can allow for the use of cassettes with slack storage, cassettes without slack storage, or both.

Figure 9:
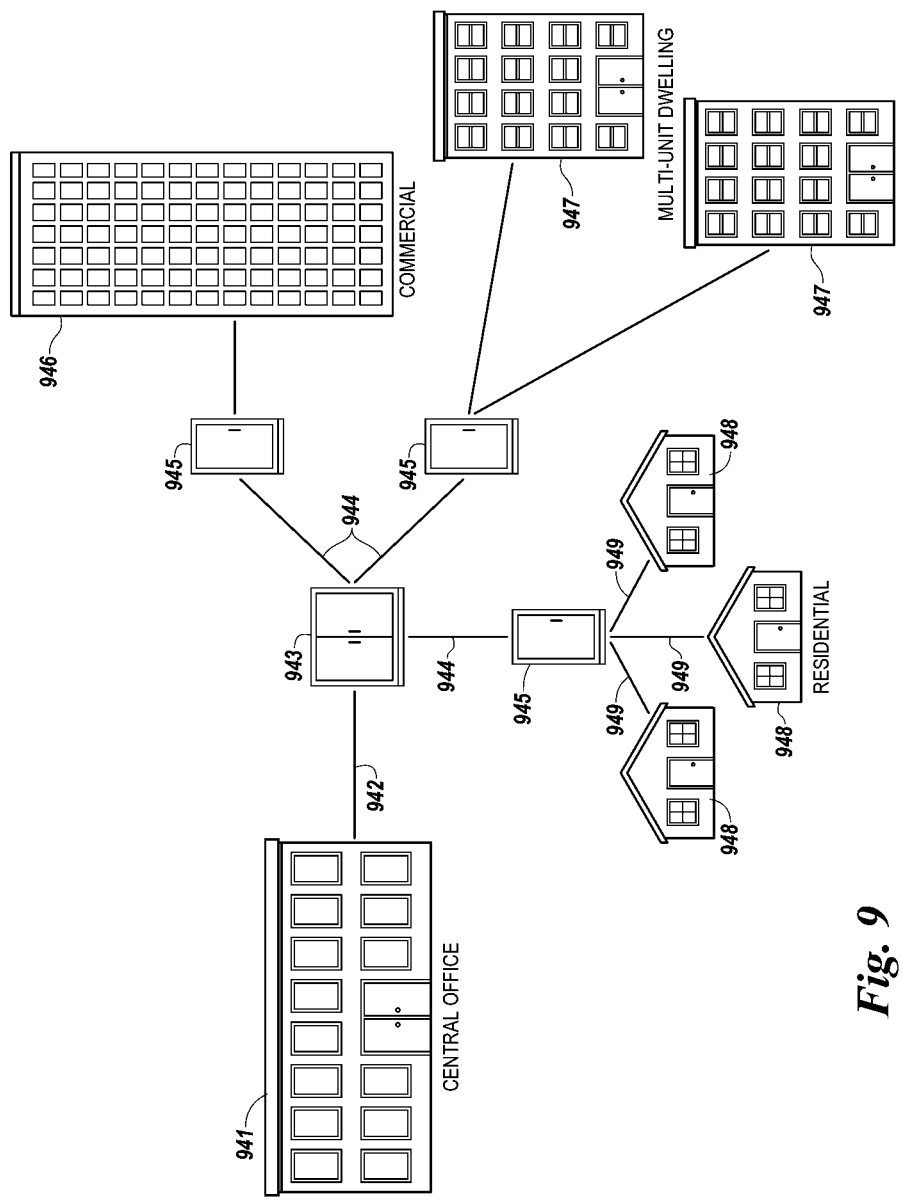
FIG. 9 is an optical fiber communication system in accordance with one or more embodiments of the present disclosure.

FIG. 9 is an optical fiber communication system in accordance with one or more embodiments of the present disclosure. FIG. 9 illustrates an OSP fiber optic feeder 942 from a central office 941 to distribution structure 943. A fiber entrance cabinet (FEC) may be located at the central office 941 (e.g., head end) typically in an off-frame splicing environment. From the distribution structure 943, OSP distribution fiber cable 944 is routed to drop structures 945, such as a fiber distribution pedestal, which can serve as a final interconnection point in a fiber to the home (FTTH) network before reaching a particular fiber's end user location (e.g., a home). Fiber downstream of the fiber distribution pedestal to the end user location is commonly referred to as "the last mile" regardless of actual distance involved. One or more individual drop fibers 949 are routed from the drop structure 945 to end users, such as residential 948, commercial 946, and/or multi-unit dwelling 947 users.

CONCLUSION

The present disclosure includes systems and apparatuses for an optical fiber management system. One embodiment of an optical fiber management system includes a cabinet comprising a system of building blocks that make up a rail-mounting system and an optical fiber management apparatus housed within one of the building blocks. The optical fiber management apparatus can comprise a housing, an adaptor plate resiliently connected to the housing, a splice tray, a housing cover, a radius limiter, and a base configured for integrated slack storage of at least one of buffer tube and ribbon cable.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An optical fiber management system comprising:
one or more L-shaped building blocks comprising:
a side portion having a rail-mounting system; and
a back portion having at least one top fastening component and at least one bottom fastening component, the at least one bottom fastening component complementary to the at least one top fastening component;
wherein the at least one top and bottom fastening component enable two or more L-shaped building blocks to be vertically coupled together;
the one or more L-shaped building blocks configured to receive an optical fiber management apparatus comprising:
a housing;
an adaptor plate; and
a radius limiter.

2. The optical fiber management system of claim 1, wherein the one or more L-shaped blocks are housed in a front-access-only cabinet; and
wherein an interior of the cabinet is not configured for slack storage.

3. The optical fiber management system of claim 1, further comprising a radius-limiting rod protruding from a front of the side portion of the one or more building blocks and configured to provide bend radius protection.

4. The optical fiber management system of claim 1, wherein the rail-mounting system comprises a first rail accommodating a first optical fiber management apparatus and a second rail accommodating a second optical fiber management apparatus.

5. The optical fiber management system of claim 1, wherein the radius limiter comprises a first portion located on the base of the optical fiber management apparatus and a second portion configured to mate with the first portion and located on a base cover of the optical fiber management apparatus.

6. An optical fiber management system comprising:
a system of removable building blocks that vertically interlock with each other and each are formed by lockable portions and extend horizontally as an L-shape, the system comprising a rail-mounting system and a radius limiting rod;
one or more optical fiber management apparatuses resiliently mounted within the rail-mounting system, wherein each optical fiber management apparatus comprise:
a housing;
an adaptor plate;
a housing cover;
a base comprising at least a first portion of a radius limiter; and
at least one of:
integrated slack storage of buffer tube; and
integrated slack storage of ribbon cable,
wherein the rail-mounting system of each building block accommodates at least two vertically stacked optical fiber management apparatuses; and
wherein each building block comprises no more than one radius-limiting rod protruding from a front of the building block and configured to provide bend radius protection.

7. The optical fiber management system of claim 6, wherein the adaptor plate is resiliently connected to the housing.

8. The optical fiber management system of claim 6, wherein at least one of the one or more optical fiber management apparatuses is preloaded with at least one of a slack storage buffer tube and a slack storage ribbon cable.

9. The optical fiber management system of claim 6, wherein each of the one or more optical fiber management apparatuses further comprises:
a splice tray; and
resiliently-connected connector tabs.

10. The optical fiber management system of claim 9, wherein each of the one or more optical fiber management apparatuses further comprises a splice tray cover distinct from the housing cover.

11. The optical fiber management system of claim 9, wherein:
the housing comprises a surface that provides a first level of individual fiber management and at least one opening that allows entry of an optical fiber cable into the housing;
the adaptor plate is resiliently connected to the housing and comprises a plurality of optical fiber connectors, the adaptor plate being releasable from the housing and providing access to both sides of the adaptor plate;
the splice tray comprises a plurality of splice channels and a surface that provides a second level of individual fiber management spaced from the first level of individual fiber management; and
the housing cover is resiliently connected to the housing, the housing cover being removable from the housing to allow access to the splice tray therebeneath.

12. The optical fiber management system of claim 9, wherein the splice tray is nested atop the base.

13. The optical fiber management system of claim 6, wherein the building blocks are housed in a cabinet not configured for slack storage of buffer or ribbon cable.

14. The optical fiber management system of claim 6, wherein the one or more optical fiber management apparatuses comprise two optical fiber management apparatuses.

15. The optical fiber management system of claim 6, wherein each of the one or more optical fiber management apparatuses further comprises a base cover resiliently connected to the base and comprising a second portion of the radius limiter.

16. The optical fiber management system of claim 6, wherein the building blocks are housed in a cabinet comprising a rail system of interlocking building blocks, wherein:
the building blocks interlock via sliding into one another; and
the building blocks comprise rails to receive a number of optical fiber management apparatuses.

17. The optical fiber management system of claim 6, further comprising a jumper route path in a central position of an interior of the cabinet and columns of the one or more of optical fiber management apparatuses on outer portions of the interior of the cabinet, wherein the jumper route path comprises a W intra-bay route path.

18. An optical fiber management system comprising:
a system of removable L-shaped building blocks that vertically interlock with each other comprising: a first lockable component mated with a second lockable component in the form of the L-shaped building blocks, the first lockable component comprising a rail-mounting system; and the rail-mounting system configured to receive up to two optical fiber management apparatuses comprising an optical fiber management cassette, the cassette comprising:
- a housing comprising a surface that provides a first level of individual fiber management and at least one opening that allows entry of an optical fiber cable into the housing;
- an adaptor plate comprising a plurality of optical fiber connectors, the adaptor plate being releasable from the housing and providing access to both sides of the adaptor plate;
- a base comprising integrated jacketed fiber storage and a first portion of a radius limiter;
- a base cover comprising a second portion of the radius limiter configured to mate with the first portion of the radius limiter;
- outside ridges configured to slide along a rail of the rail-mounting system of one of the L-shaped building blocks; and
- a splice tray comprising a plurality of splice channels, at least one fiber nest that provides storage of coiled individual optical fiber, and a surface that provides a second level of individual fiber management spaced from the first level of fiber management.

19. The optical fiber management system of claim 18, further comprising a housing cover resiliently connected to the housing, wherein when the adaptor plate is exercised from a front of the cassette, both sides of the adaptor plate are accessible without removing the housing cover, and the housing cover is removable from the housing to allow access to the splice tray therebeneath.

20. The optical fiber management system of claim 18, wherein the integrated jacketed fiber storage comprises continuous storage of buffer tube storage, 900 micron fiber storage, and 250 micron fiber storage.

* * * * *